US012589468B2

(12) United States Patent
Huang et al.

(10) Patent No.: US 12,589,468 B2
(45) Date of Patent: Mar. 31, 2026

(54) ELECTRIC VISE

(71) Applicant: Jackco Transnational Inc., Azusa, CA (US)

(72) Inventors: John Huang, Azusa, CA (US); David M. Lew, Arcadia, CA (US)

(73) Assignee: Jackco Transnational Inc., Azusa, CA (US)

( * ) Notice: Subject to any disclaimer, the term of this patent is extended or adjusted under 35 U.S.C. 154(b) by 467 days.

(21) Appl. No.: 17/669,130

(22) Filed: Feb. 10, 2022

(65) Prior Publication Data

US 2022/0250211 A1 Aug. 11, 2022

Related U.S. Application Data

(60) Provisional application No. 63/147,879, filed on Feb. 10, 2021.

(51) Int. Cl.

| | |
|---|---|
| ***B25B 1/00*** | (2006.01) |
| ***B25B 1/10*** | (2006.01) |
| ***B25B 1/18*** | (2006.01) |
| ***B25B 1/24*** | (2006.01) |
| ***B25B 5/00*** | (2006.01) |

(Continued)

(52) U.S. Cl.

CPC ................ *B25B 1/18* (2013.01); *B25B 1/103* (2013.01); *B25B 1/106* (2013.01); *B25B 21/026* (2013.01); *B25B 1/02* (2013.01); *B25B 1/24* (2013.01); *B25B 1/2494* (2013.01)

(58) Field of Classification Search

CPC .. B25B 1/18; B25B 1/103; B25B 1/16; B25B 1/02; B25B 1/10; B25B 21/026; B25B 1/24; B25B 1/2405; B25B 1/106; B25B 1/2494; B25B 27/0085; B23Q 3/066; B23Q 3/02

USPC ...................... 269/246, 43, 242, 25, 32, 283

See application file for complete search history.

(56) References Cited

U.S. PATENT DOCUMENTS 3,722,768 A * 3/1973 Schnellmann ....... G03D 13/001 414/412

4,418,765 A * 12/1983 Mori ...................... B25B 23/14 81/470

(Continued)

FOREIGN PATENT DOCUMENTS

AT 525475 A2 * 4/2023 ............. B25B 1/103

CN 105033703 A * 11/2015

(Continued)

*Primary Examiner* — Mahdi H Nejad

(74) *Attorney, Agent, or Firm* — Schwegman Lundberg & Woessner, P.A.

(57) ABSTRACT

A power vise including a body and a jaw connected to and extending from the vise body. The vise can also include an actuator extending at least partially through the jaw body, where the actuator can include a first end and a second end opposite the first end. The vise can include a moving jaw connected to the first end of the actuator. The vise can include a motor connected to the second end of the actuator, where the motor can be operable to move the actuator to move the moving jaw with respect to the fixed jaw, including a hammering or impacting function, and that such hammering or impacting can be performed after a predetermined delay. The vise can include a sensor configured to produce a signal based on a condition of the vise and to control the vise at least in part on using that signal.

20 Claims, 5 Drawing Sheets

(51) Int. Cl.
*B25B 21/02* (2006.01)
*B25B 1/02* (2006.01)

(56) References Cited

U.S. PATENT DOCUMENTS

| | | | | | |
|---|---|---|---|---|---|
| 4,605,208 | A * | 8/1986 | Durham | B25B 1/18 269/247 |
| 4,770,401 | A * | 9/1988 | Donaldson | B25B 1/18 269/283 |
| 5,014,793 | A * | 5/1991 | Germanton | H02P 1/18 81/473 |
| 5,133,536 | A * | 7/1992 | Goodman | B25B 1/2457 269/283 |
| 6,273,485 | B1 * | 8/2001 | Maffeis | B25B 5/061 294/207 |
| 6,698,740 | B1 * | 3/2004 | Slagle | B25B 1/18 269/277 |
| 11,225,986 | B2 * | 1/2022 | Chen | F01C 21/18 |
| 2002/0185800 | A1 * | 12/2002 | Duncan | B25B 1/103 269/242 |
| 2007/0007704 | A1 * | 1/2007 | Hooper | B25B 1/103 269/246 |
| 2008/0023925 | A1 * | 1/2008 | Tomita | B25J 15/026 279/47 |
| 2010/0072240 | A1 * | 3/2010 | Cornes | B25B 1/103 224/536 |
| 2015/0010369 | A1 * | 1/2015 | Orndorf | B25B 1/06 192/66.1 |
| 2016/0250738 | A1 * | 9/2016 | Leh | B25B 23/1475 173/176 |
| 2019/0126456 | A1 * | 5/2019 | Abbott | B25F 5/02 |
| 2021/0268628 | A1 * | 9/2021 | Gray | B25B 1/10 |
| 2024/0217077 | A1 * | 7/2024 | Chen | B25B 21/02 |

FOREIGN PATENT DOCUMENTS

| | | | | |
|---|---|---|---|---|
| CN | 108526963 | A * | 9/2018 | |
| CN | 208534887 | U * | 2/2019 | |
| CN | 114441129 | A * | 5/2022 | G01N 3/02 |
| EP | 3726052 | A1 * | 10/2020 | |
| TW | 202032049 | A * | 9/2020 | F01C 21/18 |

* cited by examiner

ELECTRIC VISE

CROSS-REFERENCE TO RELATED APPLICATION

This patent application claims the benefit of U.S. Provisional Patent Application No. 63/147,879 filed Feb. 10, 2021, which is incorporated by reference herein in its entirety.

BACKGROUND

Vises are tools commonly used for holding other tools or workpieces. A vise is typically secured or securable to a work surface, such as a worktable or a work bench. Most vises include two or more jaws where at least one jaw is movable to engage a tool or workpiece. A handle or bar can be operable to move the jaws to engage the workpiece to secure the workpiece in place with respect to the vise and the workbench. However, it can be hard to clamp a workpiece when two hands are need to hold the workpiece.

One attempt at a self-clamping vise is found in U.S. Pat. No. 7,293,765 to Ronald L. Hooper ("Hooper"). Hooper refers to electrical and hydraulic power vises. An electrical version of Hooper's power vise has a motor for driving a jaw of the vise. A hydraulic version of Hooper's power vise uses a mechanical clutch force regulator to prevent excessive clamping. Hooper's vise regulates force with a clutch and its applied force is limited to the amount of force applied by the electrical or hydraulic power applied to the vise. If high forces are needed, the Hooper vise may close abruptly and potentially result in damage to the part being clamped or injury to the user.

There is a need in the art for a vise that can be operated to provide sufficient clamping force, but without rapid or sudden movement of the jaw or jaws of the vise that may result in damage or injury. The vise should preferably be safe for a beginner to use it safely.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Vises can be used to support tools and workpieces to free up one or more hands for performing work on a workpiece.

Opening and closing a vise often requires use of a handle to operate an actuator (such as a drive screw), which may take some time and requires the use of one or more hands, such as one to hold the workpiece and one hand to operate the handle. Electric motors have been included in vises to speed up opening and closing operations; however, operation of such a motor can cause too much force to be applied to the workpiece, which can cause damage to the workpiece or the vise.

The inventors recognized that in various embodiments an electric vise including an impact system to apply pulses of torque between a first jaw and a second jaw of the vise. This allows the clamping force to be pulsed to allow the first and second jaws to bear down on a workpiece in the vise, without damaging the workpiece. In various embodiments, the electric vise further includes a clutch to allow the system to controllably engage the motor with at least one actuator that applies clamping force between the first jaw and the second jaw of the electric vise. In various embodiments, the clutch is configured to engage at a higher RPM range of the electric motor and when engaged it activates an impacting hammer to increase the force or torque applied to the workpiece. In various embodiments, the electric vise uses one or more sensors and a controller to control the action of at least one jaw of the electric vise. In various embodiments, the sensors include a speed sensor, a position sensor, a torque sensor or combinations thereof to control the action of the electric vise. In various embodiments the one or more sensors are used with the controller to at least partially control the rate of torque increase or speed increase of at least one jaw with respect to another jaw of the electric vise. In various embodiments, other inputs may be used by the controller to control the operation of the electric vise. In various embodiments, the vice employs a delay after the jaws of the vice close so that if anything is caught in the vise, the delay will allow the operator to remove them from the vise or turn off the vise before beginning the impacting function. This delay can be implemented using the controller. In various embodiments the delay is a second after the vise jaws clamp closed before the impacting function is performed. Other delays may be employed, such as about two seconds, three seconds, or more. In various embodiments the controller is connected to a sensor to determine when the actuator closing the jaws comes to a stop, indicating that the jaws of the vise are closed on the workpiece. The controller then applies the delay before the impacting function is performed. In various embodiments, the controller is programmable to control the amount of the delay. Other sensors and controls can be applied without departing from the scope of the present subject matter.

Figure 1:
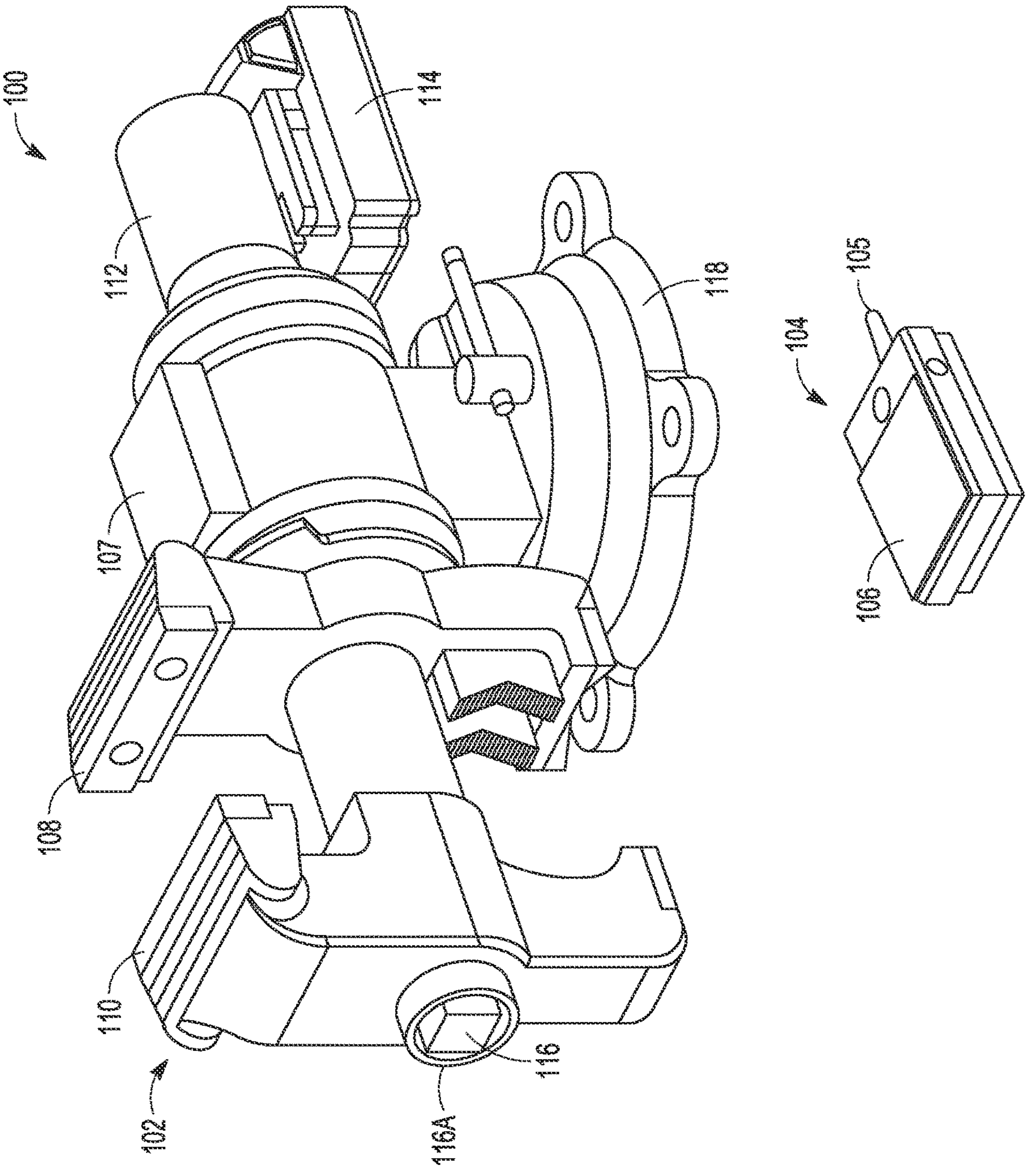
FIG. 1 illustrates an isometric view of a vise system according to one embodiment of the present subject matter.

FIG. 1 illustrates an isometric view of a vise system 100 according to one embodiment of the present subject matter. The vise system 100 can include a vise 102 and a pedal 104. The pedal 104 can include a transceiver 105 and a control feature 106. The vise 102 can include a body 107, a fixed jaw 108, a moving jaw 110, a motor assembly 112, a battery 114, an actuator 116, and a mount 118. In various embodiments, the pedal 104 can be wired to the vise 102. In various embodiments the battery 114 is a removable battery. In various embodiments the battery 114 is a rechargeable battery. Other power sources may be used without departing from the scope of the present subject matter.

The pedal 104 communicates with the motor assembly 112. In various embodiments, the communications are provided to the controller, which is connected to the motor 112. The control feature 106 can be a pedal, a potentiometer, a switch, or other control device operable by a user to control operation of the motor assembly 112. The transceiver 105 can be a wireless or wired transceiver. In various embodiments, the wireless communications include one or more of Bluetooth, Wi-Fi, or other communications. In various embodiments, the transceiver communicates with the motor assembly 112 and the control feature 106 to transmit signals to or from the motor and the control feature 106. It is understood that in various embodiments, the pedal 104 can also employ a unidirectional wireless transmitter to control the electric vise.

The body 107 of the vise 102 can be a rigid or semi-rigid structure made of materials such as one or more of metals, plastics, foams, elastomers, ceramics, composites, combinations thereof, or the like. The body 107 can be connected to the mount 118, which can include a flange and one or more bores for securing the body 107 and the vise to a workbench or the like.

The fixed jaw 108 can be connected to and can extend from the body 107 and can be relatively immovable with respect to the body. The moving jaw 110 can be a jaw connected to the actuator 116 and configured to move therewith allowing the jaws 108 and 110 to open and close. The jaws 108 and 110 can include one or more engagement surface (optionally including teeth or rubber or plastic surfaces) for engaging a workpiece to secure the workpiece between the jaws 108 and 110.

The motor assembly 112 can be an electric motor, pneumatic motor, or the like. The motor assembly 112 can be operable to drive a shaft to rotate about an axis of the shaft in response to a power input. The motor assembly 112 can be a fixed speed motor or a variable speed motor. The motor assembly 112 can be connected directly or indirectly to the actuator 116 and can be supported by the body 107 of the vise 102.

In various embodiments, the battery 114 includes a capacitor that can be configured to store power received. In various embodiments the battery 114 is a rechargeable battery. In various embodiments, the battery 114 is a replaceable battery configured to provide power to the motor assembly 112. In various embodiments, the battery 114 is releasably couplable to the motor assembly 112.

The actuator 116 can be a threaded rod, unthreaded rod, shaft, or other actuator extending at least partially through the body 107. A first end 116*a* of the actuator 116 can be connected to the moving jaw 110 and a second end 116*b* can be connected (directly or indirectly) to the motor assembly 112. Further details of the vise system 100 and operation thereof are discussed below with respect to FIGS. 2-5.

Figure 2:
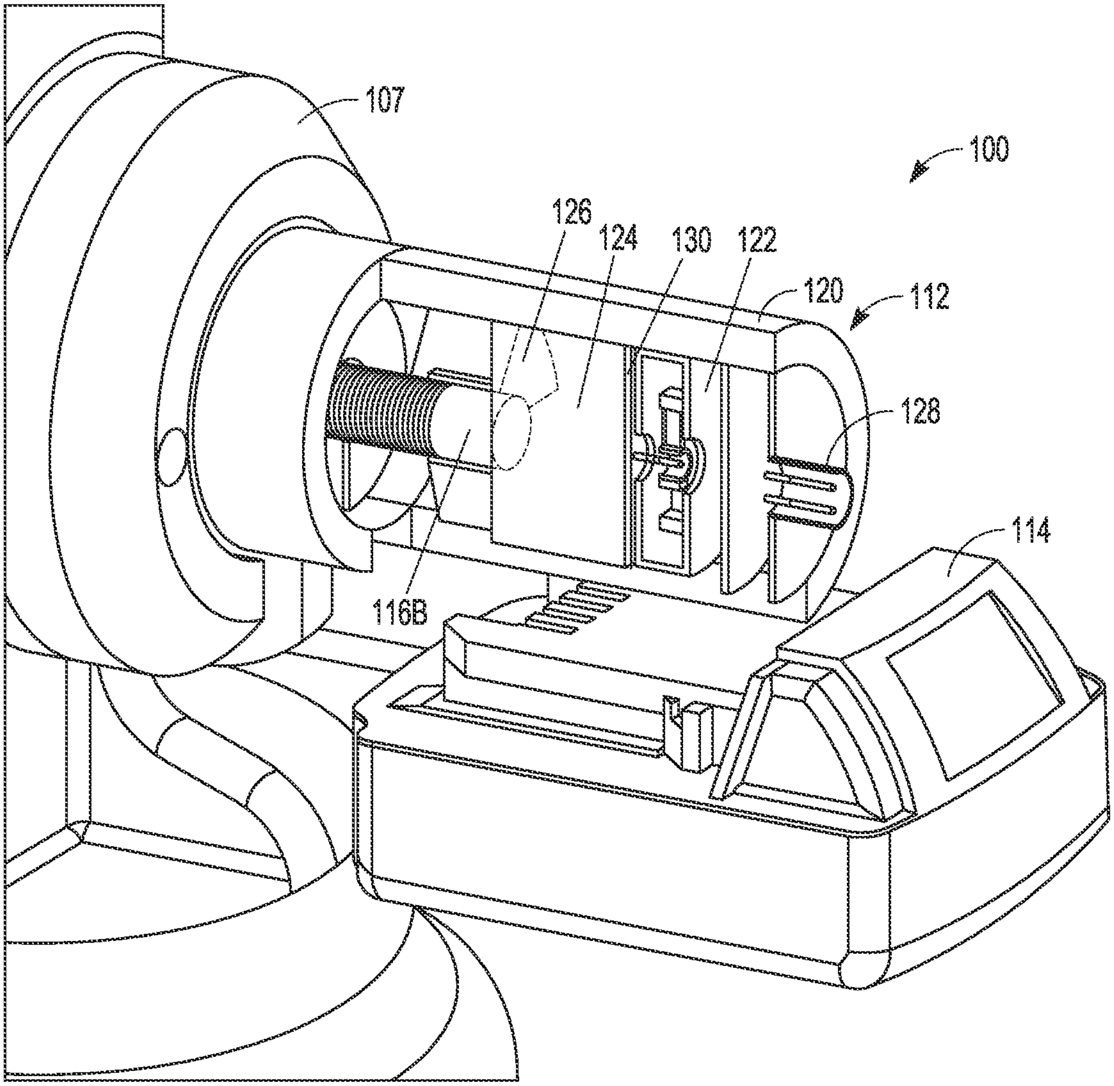
FIG. 2 illustrates a cross-sectional view of a portion of a vise system according to one embodiment of the present subject matter.

FIG. 2 illustrates a cross-sectional view of a portion of the vise system 100 according to one embodiment of the present subject matter. FIG. 2 shows that the motor assembly 112 can be connected to the actuator 116 at the second end 116*b* and FIG. 2 shows that the motor assembly 112 can include a housing 120 that can contain several components of the motor assembly 112 and vise assembly 100.

For example, a motor 122 can be located within the housing 120, where the motor 122 can be connected indirectly to the actuator 116*b* by a clutch 124. In various embodiments, the vise includes an impacting mechanism 126 in the housing 120. In various embodiments, the electric vise includes a clutch 124 configured to implement the impacting function of the vise. In various embodiments the clutch 124 provides an electronically controlled clutch in communication with the controller. The impact mechanism 126 can also interface with the actuator 116 to selectively deliver torque thereto to cause rotation of the actuator 116.

The motor assembly 112 can also include a controller 128, which can be in communication with the motor 122 and the clutch 124. The controller 128 can be a programable controller, such as a single or multi-board computer, a direct digital controller (DDC), a programable logic controller (PLC), or the like. In other examples the controller 128 can include a computing device, such as a handheld computer, for example, a smart phone, a tablet, a laptop, a desktop computer, or any other computing device including a processor, memory, and communication capabilities.

The motor assembly 112 can also include sensor 130, which can be a speed sensor configured to determine a speed of one or more of the motor 122, the clutch 124, the impact mechanism 126, or the actuator 116. The sensor 130 can be other sensors, such as a current sensor, torque sensor, force sensor, or the like, as discussed in further detail below with respect to FIG. 4.

Figure 3:
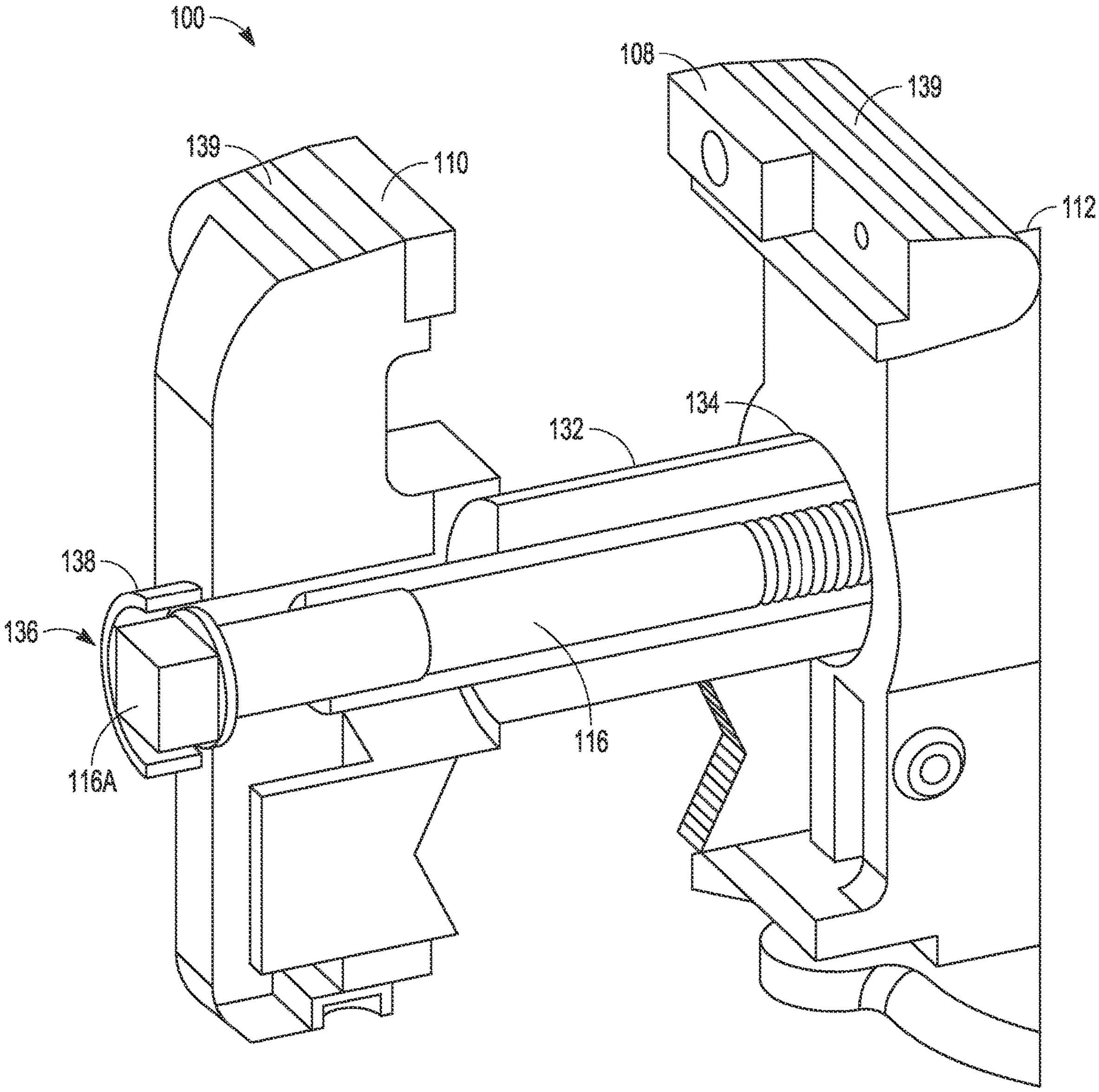
FIG. 3 illustrates a cross-sectional view of a portion of a vise system according to one embodiment of the present subject matter.

FIG. 3 illustrates a cross-sectional view of a portion of the vise system 100 according to one embodiment of the present subject matter. FIG. 3 shows how the movable jaw 110 connects to the body 107 and the fixed jaw 108. For example, FIG. 3 shows a shaft 132 of the movable jaw 110 that extend into a bore 134 of the body 107 and the fixed jaw 108. The actuator 116 can be located at least partially within the shaft 132 and can be secured to a distal end of the moving jaw 110. The shaft 132 can be movable within the bore 134 to move the movable jaw 110 with respect to the fixed jaw 108 to clamp objects therebetween. The actuator 116 can be rotatable within the shaft 132 to cause translation of the shaft 132 and therefore the movable jaw 110. In various embodiments, both jaws of the vise are movable jaws. In various embodiments, the actuator includes a piston or other actuator assembly.

FIG. 3 also shows that the actuator 116 can include a square head 136 at the first end 116*a*. The square head 136 can engage an outer portion of the jaw such that when the actuator 116 rotates to cause linear motion of the actuator 116, the moving jaw 110 moves with the actuator 116 to close the jaws 110 and 108. The square head 136 can also help to limit operation of the actuator 116 using common tools, such as a hex head wrench or socket. Such a shape can thereby help to limit unintended damage to the vise system 100. Though a square head is shown, other bolt head types can be used (e.g., security hexolubular or the like).

FIG. 3 further shows a spring collar 138, which can be engaged with the square head 136. The collar 138 can be sprung such that active force is required to engage the actuator 116.

FIG. 3 also shows a force sensor 139 that can be mounted to the fixed jaw 108. Optionally, a force sensor 139 can be mounted to the moving jaw 110. The force sensor 139 can be configured to detect a force produced by the jaws 108 and 110 engagement with each other or engagement with objects therebetween. The force sensor 139 can transmit the force signal to the controller 128.

Figure 4:
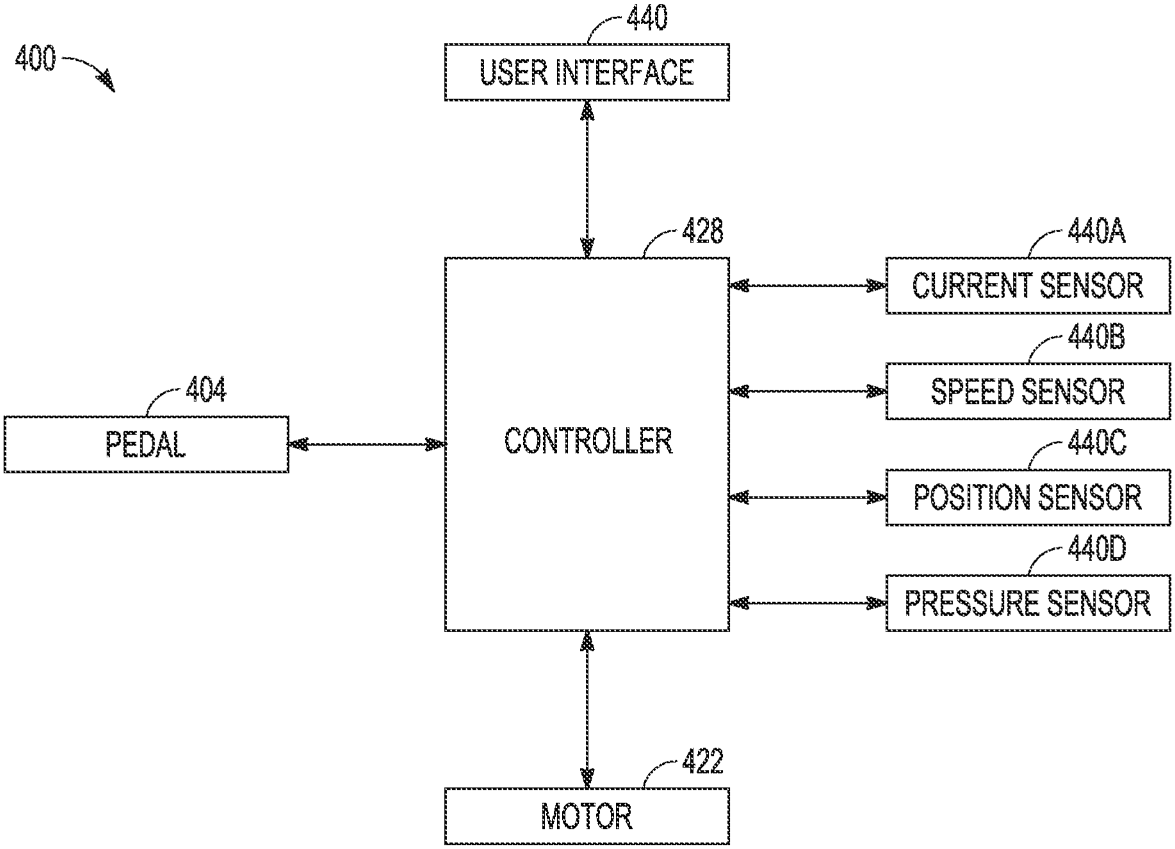
FIG. 4 illustrates a block diagram of a vise system according to one embodiment of the present subject matter.

FIG. 4 illustrates a block diagram of a vise system 400 according to one embodiment of the present subject matter. The vise system 400 can be similar to or can include the components of the vise system 100. FIG. 4 shows how various components of such a system can be connected and the discussion below covers how the components can operate.

The controller 428 can be the controller 128 and can be one of many controller types as discussed with respect to the controller 128. The vise system 400 can include a pedal 404, which can be similar to the pedal 104 and can include a control feature and a transceiver that is connected to or in communication with the controller 428. The motor 422 can be similar to the motor 122 and can be in communication with or connected to the controller 428. The controller 428 can also be in communication with one or more sensors 440*a*-440*d*.

The user interface 440 can be any display and/or input device. For example, user interface can be a monitor, keyboard, and mouse in one example. In other examples, user interface 440 can be a touch screen display. In yet another example, user interface 440 can include lights, buttons, and/or switches. The controller 428 and user interface 406 can include machine readable medium. The terms "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In operation of some examples, when a user desires to operate the vice system (100 or 400), the user can operate the control feature of the pedal 404 which can transmit a signal to the controller 428 to operate the motor 422. Optionally, the user can use the user interface 440 to operate the motor 422 or the user interface can be configured to display an indication that the motor 422 is operating or not operating, or that there is a problem or that a limit (e.g., torque limit) has been met.

When the control feature of the pedal 404 is operated, the transceiver of the pedal can transmit the signal to the controller 428. Once the signal to operate the vise is received by the controller 428, the controller 428 can operate the motor 422 to move the actuator (e.g., 116) to open or close the moving jaw (e.g., 110). Optionally, the controller 128 can wait a set amount of time before starting the motor 422. In various embodiments, the controller can sense when the jaws of the vice have closed and delay the hammering or impacting function for a fixed amount of time for additional safety of the user. The controller can delay the motor for 1, 2, 3, 4, 5, 6, or the like, seconds before starting. When the motor 422 is started by the controller 428, the controller 428 can optionally use a slow start where the controller 428 starts the motor at a low rotational speed and gradually increases the speed. The controller 428 can continue to operate the motor 422 until the signal from the pedal 404 stops or until one or more threshold criteria is met. Similarly, the pedal 404 can be used to operate the motor in reverse to open the jaws.

The controller can also control the motor based at least on one or more of a current signal from a current sensor 440*a*, a speed signal from a speed sensor 440*b*, a position signal from a position sensor 440*c*, or a force signal from a force sensor 440*d*, as discussed in further detail below.

The current sensor 440*a* can be connected to the motor 422 and can be configured to detect a current drawn by the motor 422 (such as from a power source). The current sensor 440*a* can produce the current signal based on the drawn power and can transmit the signal to the controller 428. The controller 428 can use the current signal to determine a speed, torque, or other condition of the motor 422. The controller 428 can use the current signal (or information derived therefrom), at least in part, to control operation of the motor 422. For example, the controller 428 can stop operation of the motor 422 when the controller 428 determines that a maximum torque is exceeded by the motor 422. Optionally, the controller 428 can send a signal to the clutch to disengage when the maximum torque is detected.

The speed sensor 440*b* can be an optical sensor, a capacitive speed sensor, an inductive speed sensor, or the like. The speed sensor 440*b* can be connected to and in communication with the controller 428. The speed sensor 440*b* can also be connected to a shaft of the motor 422 or the actuator 116 or coupled nearby one or more of these components for determining a rotational speed thereof. The speed sensor 440*b* can produce a speed signal based on the detected speed, where the speed signal can be transmitted to the controller 428. The controller 428 can use the speed signal to determine a rotational speed of the motor 422 or the actuator 116 and therefore a linear speed of the actuator 116 and the moving jaw 110. The controller 428 can use the speed signal (or information derived therefrom), at least in part, to control operation of the motor 422. For example, the controller 428 can stop or slow operation of the motor 422 when the controller 428 determines that a maximum speed is exceeded by the motor 422 or actuator.

Optionally, the controller 428 can send a signal to the clutch to controllably engage the motor to perform the hammering or impacting function. The controller 428 can also use the speed signal to perform a slow start to operation of the motor 422 or to perform a slow close. A slow start can be a slow increase in speed of the motor 422 when the motor first begins rotating, such as after a prolonged break in operation (e.g., 60 seconds or more), or after power-on, or when the jaws are near a full open position. A slow close can be a reduction of speed of the motor 422 when it is determined that an objected has contacted one or more of the moving jaw 410 and the fixed jaw 408, such as through the force signal of the force sensor 440*d*.

The position sensor 440*c* can be a sensor connected to or in communication with the controller 428. The position sensor 440*c* can also be connected to the actuator 116 or coupled nearby the actuator for determining a linear position of the actuator (and therefore of the moving jaw 110). The position sensor 440*c* can produce a position signal based on the detected position of the actuator 116, where the position signal can be transmitted to the controller 428. The controller 428 can use the position signal to determine a position of the actuator 116 and therefore a position of the moving jaw 110. The controller 428 can use the position signal (or information derived therefrom), at least in part, to control operation of the motor 422. For example, the controller 428 can stop operation of the motor 422 when the controller 428 determines that a maximum position is reached. Optionally, the controller 428 can send a signal to the clutch to disengage when the maximum position(s) is/(are) detected.

The force sensor 440*d* can be a sensor connected to or in communication with the controller 428. The force sensor 440*d* can also be connected to one or more of the moving jaw 110 and the fixed jaw 108. Optionally, there can be more than one force sensor 440*d* connected to each jaw. The force sensor 440*d* can produce a force signal based on the force detected at the jaw(s) 108(110), where the force signal can be transmitted to the controller 428. The controller 428 can use the force signal to determine a force being applied by the jaw(s). The controller 428 can use the force signal (or information derived therefrom), at least in part, to control operation of the motor 422. For example, the controller 428 can stop operation of the motor 422 when the controller 428 determines that a maximum force is exceeded by the jaws. Optionally, the controller 428 can send a signal to the clutch controllably perform the hammering or impacting function of the vise. The controller 428 can also use the force signal to perform a slow close. A slow close can be a reduction of speed of the motor 422 when it is determined that an objected has contacted one or more of the moving jaw 410 and the fixed jaw 408 through the force signal of the force sensor 440*d*.

When the controller 428 determines any problems such as a limit (e.g., torque, speed, or force) being exceeded, the controller 428 can activate the user interface 440 to produce an alarm (e.g., audible or visual) to notify the user that a problem has arisen. If the user interface 440 is a screen or display, an error message explaining the error can be produced by the controller 428 and displayed, such as in text. Optionally, the error can be overridden by input from the user that can be received through the user interface 440, such as through a button or through the pedal 404. Optionally, some max thresholds can be over-ridden (e.g., maximum speed) and other may not be over-ridden (e.g., maximum force).

Figure 5:
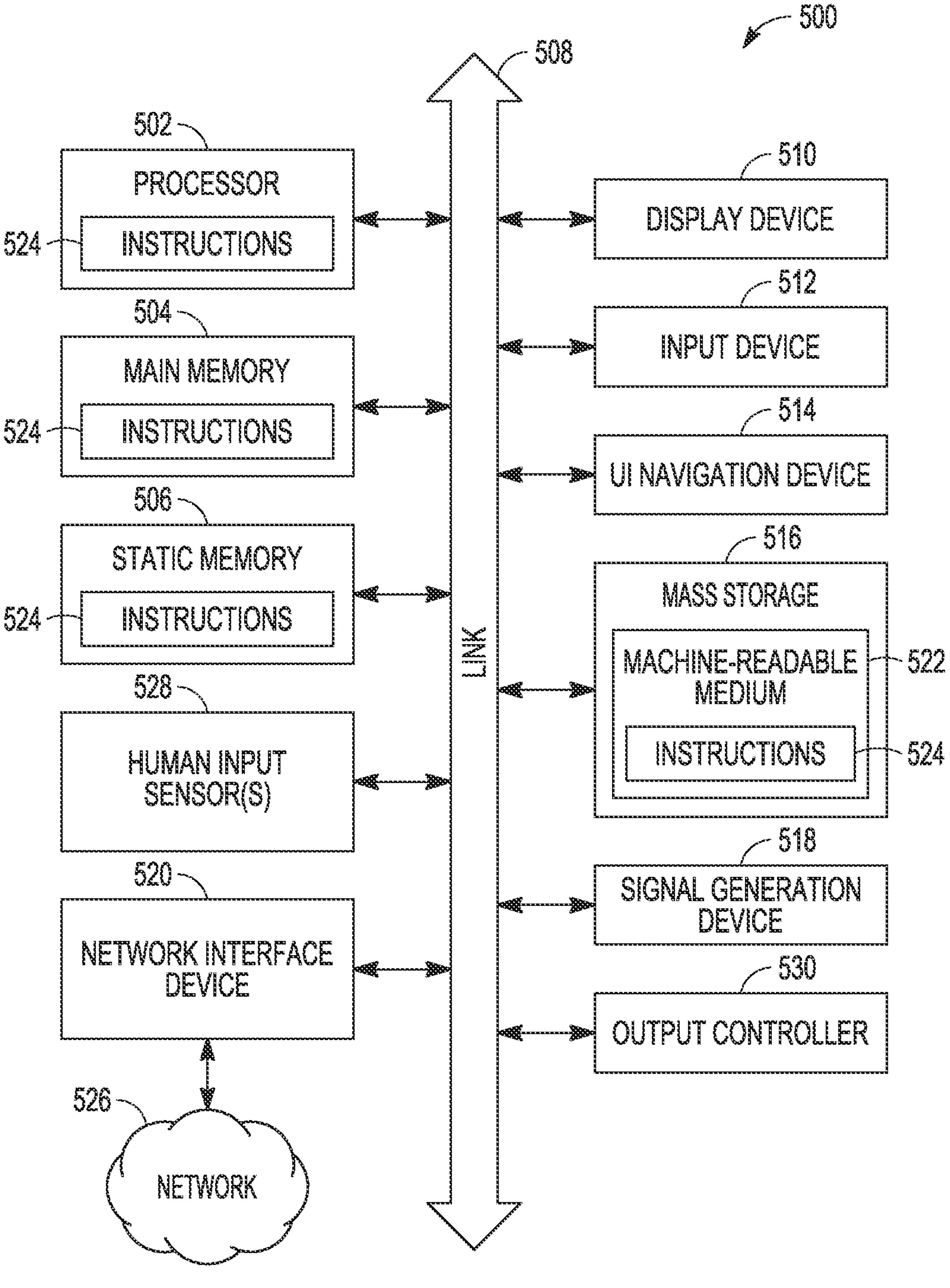
FIG. 5 illustrates a block diagram an example of a machine upon which one or more embodiments may be implemented, according to various embodiments of the present subject matter.

FIG. 5 illustrates a block diagram of an example machine 500 upon which any one or more of the embodiments may be implemented, according to various embodiments of the present subject matter. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

EXAMPLES

The following, non-limiting examples, detail some aspects of various embodiments of the present subject matter to solve the challenges and provide the benefits discussed herein, among others.

Example 1 is a power vise comprising: a vise body; a motor disposed at least on or in about the vise body; a first jaw and a second jaw; at least one actuator connected such that the motor moves the first jaw with respect to a second jaw; and an impact driver connected to the motor and the at least one actuator to deliver impact force to the first jaw with respect to the second jaw.

In Example 2, the subject matter of Example 1 optionally includes a controller configured to operate the motor to move the first jaw and the second jaw.

In Example 3, the subject matter of Example 2 optionally includes wherein the controller is configured to adjust a force output of the motor based on a predetermined delay.

In Example 4, the subject matter of Example 3, wherein the predetermined delay is 2 seconds.

In Example 5, the subject matter of any one of Examples 1-4 optionally including a rechargeable battery configured to deliver power to the motor.

In Example 6, the subject matter of any one of Examples 1-5 optionally including wherein the actuator includes a threaded drive screw to drive at least the first jaw.

In Example 7, the subject matter of Example 6 optionally including wherein the second jaw is fixed to the vise body and the threaded drive screw is configured to drive the first jaw towards the second jaw.

In Example 8, the subject matter of any one of Examples 1-7 optionally including a force sensor to sense force applied between the first jaw and the second jaw, the force sensor in communication with the controller.

In Example 9, the subject matter of any one of Examples 1-8 optionally including a clutch connected to the motor and the impact driver, the clutch configured to control torque applied by the motor and the impact driver.

In Example 10, the subject matter of any one of Examples 1-9 optionally including a square bolt head connected to a first end of the at least one actuator to connect at least one jaw to the at least one actuator.

In Example 11, the subject matter of Example 11 optionally including a sprung collar surrounding the square bolt head.

In Example 12, the subject matter of any one of Examples 2-11 optionally including a speed sensor configured to produce a speed signal based on a speed of the at least one actuator; wherein the controller is configured to operate the motor based at least in part on the speed signal.

In Example 13, the subject matter of any one of Examples 1-12 optionally including a user interface in communication with the controller to control the motor based at least in part on the speed signal.

In Example 14, the subject matter of any one of Examples 2-13 optionally including a current sensor configured to produce a current signal based on a current of the motor, and wherein the controller is configured to operate the motor based at least in part on the current signal.

In Example 15, the subject matter of any one of Examples 2-14 optionally including a force sensor connected to sense force applied between the first jaw and the second jaw to produce a clamping force signal; wherein the controller is configured to operate the motor based at least in part on the clamping force signal.

In Example 16, a power vise, comprising: a vise body; a fixed jaw connected to and extending from the vise body; an actuator extending at least partially through the jaw body, the actuator including a first end and a second end opposite the first end; a moving jaw connected to the first end of the actuator; a motor connected to the second end of the actuator, the motor operable to move the actuator to move the moving jaw with respect to the fixed jaw; an impact driver configured to controllably provide impact from the motor to the actuator; and a controller connected to the vise body, the controller configured to operate the motor to move the moving jaw and to control hammering from the impact driver.

In Example 17, the subject matter of Example 16 further comprising wherein the controller is configured to activate hammering from the impact driver after a predetermined delay.

In Example 18, the subject matter of any of Examples 16-17, further comprising a rechargeable battery releasably secured to the motor to deliver power thereto.

In Example 19, the subject matter of any of Examples 16-18, further comprising a clutch connected to the motor and configured to apply torque to the actuator.

In Example 20, the subject matter of any of Examples 16-19, further comprising a user interface in communication with the controller, to control the operation of the motor.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. The scope of the invention should be determined with reference to the appended claims, along with the full scope of equivalents to which such claims are entitled.

The invention claimed is:

1. A power vise, comprising:
a vise body;
a motor disposed at least on or in about the vise body;
a first jaw and a second jaw;
at least one actuator connected such that the motor moves the first jaw with respect to the second jaw;
an impact driver connected to the motor and the at least one actuator to deliver impact force to the first jaw with respect to the second jaw; and
a controller configured to operate the motor to move the first jaw with respect to the second jaw,
wherein the controller is configured to sense closing of the first jaw and the second jaw and apply an impacting function after the adjustable delay to adjust a force output of the motor based on the adjustable delay.

2. The power vise of claim 1, wherein the controller is configured to sense when the first jaw and the second jaw close.

3. The power vise of claim 2, wherein the controller is configured to adjust the force output of the motor after sensing the first jaw and the second jaw closed.

4. The power vise of claim 1, wherein the adjustable delay is 2 seconds.

5. The power vise of claim 1, further comprising:
a rechargeable battery configured to deliver power to the motor.

6. The power vise of claim 1, wherein the at least one actuator includes a threaded drive screw to drive the first jaw.

7. The power vise of claim 6, wherein the second jaw is fixed to the vise body and the threaded drive screw is configured to drive the first jaw towards the second jaw.

8. The power vise of claim 1, further comprising a force sensor to sense force applied between the first jaw and the second jaw, the force sensor in communication with the controller.

9. The power vise of claim 1, further comprising:
a clutch connected to the motor and the impact driver, the clutch configured to control torque applied by the motor and the impact driver.

10. The power vise of claim 1, further comprising:
a square bolt head connected to a first end of the at least one actuator to connect the first jaw to the at least one actuator.

11. The power vise of claim 10, further comprising:
a sprung collar surrounding the square bolt head.

12. The power vise of claim 1, further comprising:
a speed sensor configured to produce a speed signal based on a speed of the at least one actuator;
wherein the controller is configured to operate the motor based at least in part on the speed signal.

13. The power vise of claim 12, further comprising:
a user interface in communication with the controller to control the motor based at least in part on the speed signal.

14. The power vise of claim 1, further comprising:
a current sensor configured to produce a current signal based on a current of the motor;
wherein the controller is configured to operate the motor based at least in part on the current signal.

15. The power vise of claim 1, further comprising:
a force sensor connected to sense force applied between the first jaw and the second jaw to produce a clamping force signal;
wherein the controller is configured to operate the motor based at least in part on the clamping force signal.

16. A power vise, comprising:
a vise body;
a fixed jaw connected to and extending from the vise body;
an actuator extending at least partially through a body of the fixed jaw, the actuator including a first end and a second end opposite the first end;
a moving jaw connected to the first end of the actuator;
a motor connected to the second end of the actuator, the motor operable to move the actuator to move the moving jaw with respect to the fixed jaw;
an impact driver configured to controllably provide impact from the motor to the actuator; and
a controller connected to the vise body, the controller configured to operate the motor to move the moving jaw and to control hammering from the impact driver,
wherein the controller is configured to sense closing of the fixed jaw and the moving jaw and to activate hammering from the impact driver after an adjustable delay.

17. The power vise of claim 16, wherein the controller is configured to sense when the jaws have closed.

18. The power vise of claim 16, further comprising:
a rechargeable battery releasably secured to the motor to deliver power thereto.

19. The power vise of claim 16, further comprising:
a clutch connected to the motor and configured to apply torque to the actuator.

20. The power vise of claim 16, further comprising:
a user interface in communication with the controller, to control the operation of the motor.

* * * * *